(12) United States Patent
Beauchesne-Martel et al.

(10) Patent No.: US 11,781,476 B2
(45) Date of Patent: Oct. 10, 2023

(54) SYSTEM AND METHOD FOR OPERATING A MULTI-ENGINE ROTORCRAFT

(71) Applicant: PRATT & WHITNEY CANADA CORP., Longueuil (CA)

(72) Inventors: Philippe Beauchesne-Martel, Brossard (CA); Poi Loon Tang, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 580 days.

(21) Appl. No.: 16/596,129

(22) Filed: Oct. 8, 2019

(65) Prior Publication Data

US 2020/0408148 A1  Dec. 31, 2020

Related U.S. Application Data

(60) Provisional application No. 62/866,178, filed on Jun. 25, 2019.

(51) Int. Cl.
| | | |
|---|---|---|
| *F02C 6/02* | (2006.01) | |
| *F02C 6/20* | (2006.01) | |
| *B64D 31/12* | (2006.01) | |
| *F02C 9/42* | (2006.01) | |
| *F02C 9/28* | (2006.01) | |
| *B64C 27/12* | (2006.01) | |

(52) U.S. Cl.
CPC ............... *F02C 6/02* (2013.01); *B64C 27/12* (2013.01); *B64D 31/12* (2013.01); *F02C 6/20* (2013.01); *F02C 9/28* (2013.01); *F02C 9/42* (2013.01); *F05D 2270/023* (2013.01); *F05D 2270/052* (2013.01); *F05D 2270/304* (2013.01); *F05D 2270/332* (2013.01)

(58) Field of Classification Search
CPC ...... F02C 6/02; F02C 6/20; F02C 9/42; F02C 9/28; F02C 7/36; B64D 31/12; B64C 27/12; F05D 2270/332; F05D 2270/052; F05D 2270/023; F05D 2270/304; F04D 2270/034
See application file for complete search history.

(56) References Cited

U.S. PATENT DOCUMENTS

| | | | |
|---|---|---|---|
| 2,798,682 | A | 7/1957 | Alderson et al. |
| 2,991,618 | A * | 7/1961 | Marscher ............... B64C 27/12 73/527 |
| 3,168,102 | A | 2/1965 | Tyler et al. |
| 3,498,057 | A | 3/1970 | Kronogard et al. |
| 3,930,366 | A | 1/1976 | Nelson |
| 3,938,320 | A | 2/1976 | Nelson |

(Continued)

FOREIGN PATENT DOCUMENTS

WO    2015145036 A1    10/2015

*Primary Examiner* — Thomas P Burke
(74) *Attorney, Agent, or Firm* — NORTON ROSE FULBRIGHT CANADA LLP

(57) ABSTRACT

The present disclosure provides methods and systems for operating a multi-engine rotorcraft. The method comprises driving a rotor of the rotorcraft with a first engine while a second engine is de-clutched from a transmission clutch system that couples the rotor and the second engine, instructing the second engine to accelerate to a re-clutching speed, and controlling an output shaft speed of the second engine during acceleration of the second engine to the re-clutching speed by applying a damping function to a speed control loop of the second engine.

18 Claims, 13 Drawing Sheets

(56) References Cited

U.S. PATENT DOCUMENTS

| | | |
|---|---|---|
| 3,963,372 A | 6/1976 | McLain et al. |
| 3,969,890 A | 7/1976 | Nelson |
| 4,043,119 A | 8/1977 | Faulkner |
| 4,531,361 A * | 7/1985 | Zagranski ............. B64C 27/001 60/791 |
| 4,625,510 A | 12/1986 | Evans |
| 5,271,295 A | 12/1993 | Marnot |
| 5,564,992 A | 10/1996 | Cunningham |
| 6,227,481 B1 | 5/2001 | Fenny et al. |
| 6,302,356 B1 | 10/2001 | Hawkins |
| 7,866,598 B2 | 1/2011 | Waide et al. |
| 7,942,079 B2 | 5/2011 | Russ et al. |
| 8,020,803 B2 | 9/2011 | Waide et al. |
| 8,027,772 B2 | 9/2011 | Vialle |
| 8,290,683 B2 | 10/2012 | Luppold |
| 8,291,715 B2 | 10/2012 | Libera et al. |
| 8,295,995 B2 | 10/2012 | Poisson |
| 8,378,510 B2 | 2/2013 | Tanaka et al. |
| 8,594,864 B2 | 11/2013 | Greenfield et al. |
| 8,808,142 B2 | 8/2014 | Al-Khairy |
| 8,825,228 B2 | 9/2014 | Corpron et al. |
| 8,827,204 B2 | 9/2014 | Long et al. |
| 8,845,489 B2 | 9/2014 | Vialle |
| 8,967,532 B2 | 3/2015 | Vialle |
| 9,026,274 B2 | 5/2015 | Hartman et al. |
| 9,051,055 B2 | 6/2015 | Schaeffer |
| 9,428,267 B2 | 8/2016 | Devita et al. |
| 9,494,085 B2 | 11/2016 | Cai |
| 9,500,138 B1 | 11/2016 | Cai et al. |
| 9,815,568 B2 | 11/2017 | Vallart et al. |
| 9,856,017 B2 | 1/2018 | Schaeffer et al. |
| 9,889,927 B2 | 2/2018 | Modrzejewski et al. |
| 10,082,184 B2 | 9/2018 | Bouton et al. |
| 10,087,902 B2 | 10/2018 | Eisenhauer et al. |
| 10,106,271 B2 | 10/2018 | Dumur |
| 10,113,487 B2 | 10/2018 | Cai et al. |
| 10,131,427 B2 | 11/2018 | Blyth et al. |
| 10,377,473 B2 | 8/2019 | Ehinger et al. |
| 2003/0094001 A1 * | 5/2003 | Desai ................... B64D 31/06 60/791 |
| 2009/0222178 A1 * | 9/2009 | Vialle ................... B64D 35/08 477/181 |
| 2013/0181087 A1 * | 7/2013 | Long .................... B64D 35/04 244/17.13 |
| 2013/0219905 A1 | 8/2013 | Marconi et al. |
| 2014/0191079 A1 | 7/2014 | Ehinger et al. |
| 2015/0113996 A1 | 4/2015 | Cai et al. |
| 2017/0101938 A1 | 4/2017 | Lescher et al. |
| 2017/0241347 A1 | 8/2017 | Marconi et al. |
| 2017/0297679 A1 | 10/2017 | Elliott et al. |
| 2017/0321601 A1 | 11/2017 | Lafargue et al. |
| 2017/0327241 A1 | 11/2017 | Mitrovic et al. |
| 2018/0163558 A1 | 6/2018 | Vondrell et al. |
| 2018/0246510 A1 | 8/2018 | Bothwell et al. |
| 2019/0055004 A1 | 2/2019 | Schaeffer et al. |

* cited by examiner

SYSTEM AND METHOD FOR OPERATING A MULTI-ENGINE ROTORCRAFT

CROSS-REFERENCE TO RELATED APPLICATIONS

The present application claims the benefit of Provisional Patent Application Ser. No. 62/866,178 filed on Jun. 25, 2019, the contents of which are hereby incorporated by reference in their entirety.

TECHNICAL FIELD

The present disclosure relates generally to a multi-engine system, and more particularly to methods and systems of operating a multi-engine rotorcraft.

BACKGROUND OF THE ART

In dual-engine helicopters, an engine output shaft is mated to the helicopter transmission clutch system that drives the helicopter main and tail rotors. When the engine output shaft speed is lower than the helicopter rotor speed, the engine de-clutches from the transmission clutch system.

In certain circumstances, the engine may be required to accelerate rapidly from a low speed to a higher operating speed of the helicopter rotor. The amount of engine torque needed for rapid acceleration, as well as the engine inertia following rapid acceleration, can potentially over-stress or damage the clutch mechanism upon re-clutching of the engine.

Therefore, improvements are needed.

SUMMARY

In accordance with a broad aspect, there is provided a method for operating a multi-engine rotorcraft. The method comprises driving a rotor of the rotorcraft with a first engine while a second engine is de-clutched from a transmission clutch system that couples the rotor and the second engine, instructing the second engine to accelerate to a re-clutching speed, and controlling an output shaft speed of the second engine during acceleration of the second engine to the re-clutching speed by applying a damping function to a speed control loop of the second engine.

In accordance with another broad aspect, there is provided a system for operating a multi-engine rotorcraft. The system comprises a processing unit, and a non-transitory computer-readable medium having stored thereon program instructions executable by the processing unit. The program instructions are executable for: driving a rotor of the rotorcraft with a first engine while a second engine is de-clutched from a transmission clutch system that couples the rotor and the second engine, instructing the second engine to accelerate to a re-clutching speed, and controlling an output shaft speed of the second engine during acceleration of the second engine to the re-clutching speed by applying a damping function to a speed control loop of the second engine.

Features of the systems, devices, and methods described herein may be used in various combinations, in accordance with the embodiments described herein.

BRIEF DESCRIPTION OF THE DRAWINGS

Reference is now made to the accompanying Figs. in which.

It will be noted that throughout the appended drawings, like features are identified by like reference numerals.

DETAILED DESCRIPTION

There are described herein methods and systems for controlling the rotational speed of an output shaft of an engine as it re-clutches into a transmission clutch system, so as to minimize transmission clutch system over-torque during re-clutching on a rapid engine speed run-up. The methods and systems may be used when exiting an asymmetric operating regime, as will be explained in more detail below. The methods and systems may also be used in normal engine run-ups, for example during ground decoupled engine run-ups, or when transitioning from One Engine Operative (OEO) to All Engines Operative (AEO). Other applications are also considered.

Figure 1A:
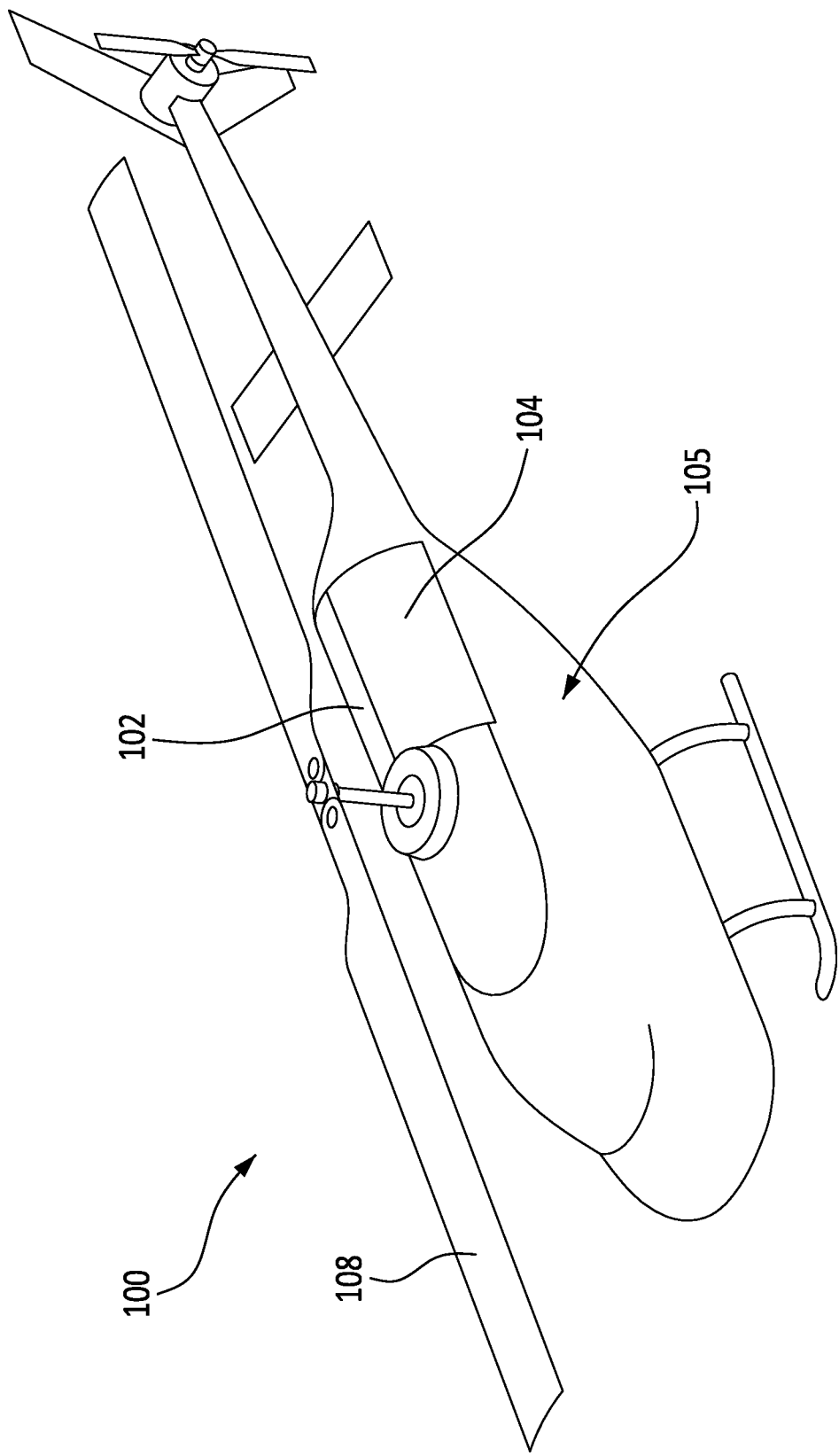
FIG. 1A is a schematic view of a multi-engine rotorcraft.

FIG. 1A depicts an exemplary multi-engine rotorcraft 100, which in this case is a helicopter. The rotorcraft 100 includes at least two gas turbine engines 102, 104. These two engines 102, 104 may be interconnected to a transmission clutch system (TCS) 105, as shown in FIG. 1B, to drive a main rotor 108.

Figure 1B:
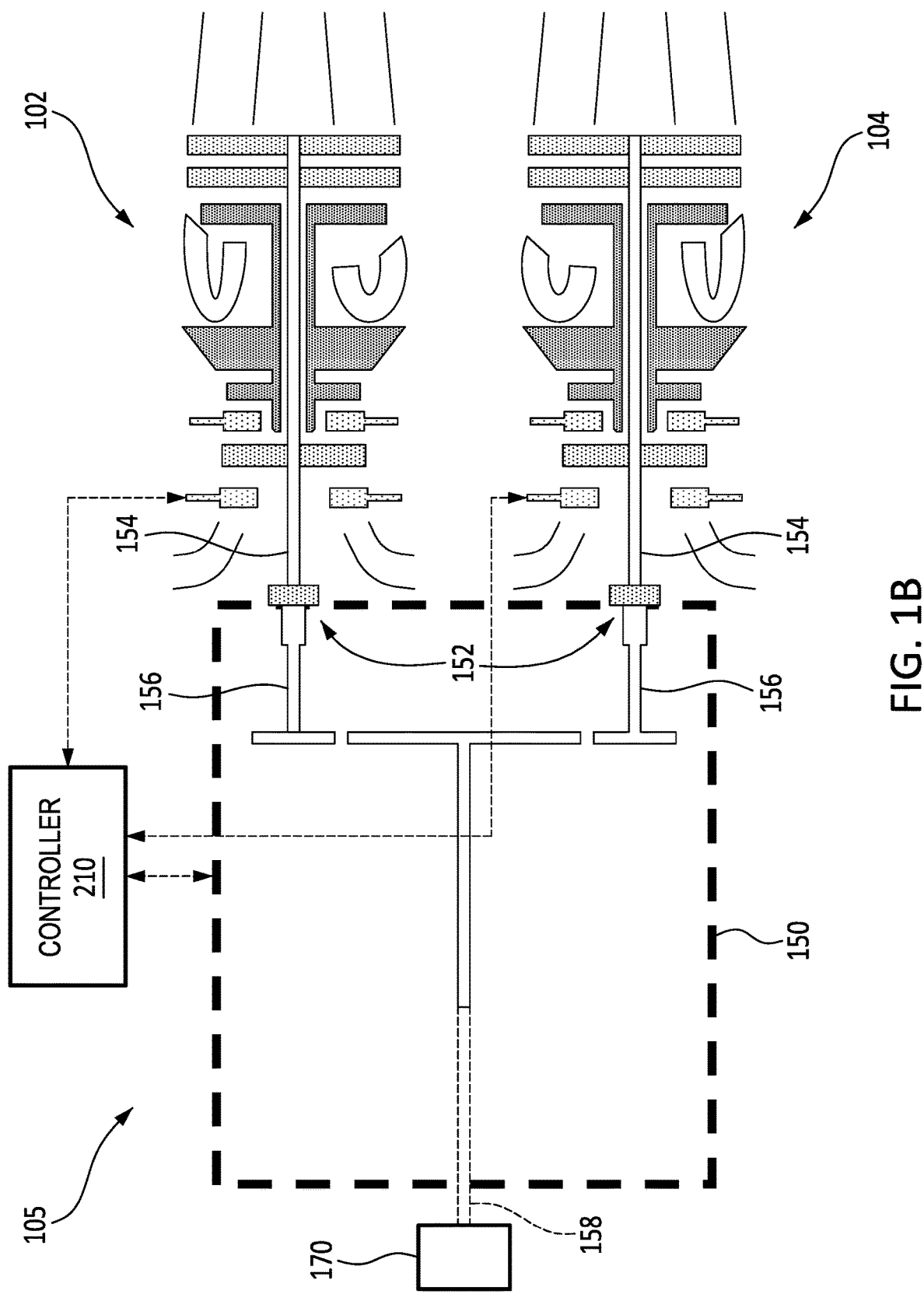
FIG. 1B is a schematic representation of an exemplary multi-engine system for the rotorcraft of FIG. 1A, showing axial cross-sectional views of two gas turbine engines.

Turning now to FIG. 1B, illustrated is an exemplary multi-engine system 105. The multi-engine system 105 may include two or more gas turbine engines 102, 104. In the case of a helicopter application, these gas turbine engines 102, 104 will be turboshaft engines. Control of the multi-engine system 105 is effected by one or more controller(s) 210, which may be FADEC(s), electronic engine controller(s) (EEC(s)), or the like, that are programmed to manage the operation of the engines 102, 104 to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 105. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions (cruise speed and altitude) are substantially stable, the engines 102, 104 of the system 105 may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime", wherein one of the two engines is operated in a lower-power (which could be no power, in some cases) "standby mode" while the other engine is operated in a high-power "active" mode. The asymmetric operating regime may be engaged for a cruise phase of flight (continuous, steady-state flight which is typically at a given commanded constant aircraft cruising speed and altitude). The multi-engine system 105 may be used in an aircraft, such as a helicopter, but also has applications in suitable marine and/or industrial applications or other ground operations.

Referring still to FIG. 1B, according to the present description the multi-engine system 105 is driving in this example a helicopter (H) which may be operated in the asymmetric operating regime, in which a first of the engines (say, 102) may be operated at high power in an active mode and the second of the engines (104 in this example) may be operated in a lower-power (which could be no power, in some cases) standby mode. In one example, the first engine 102 may be controlled by the controller(s) 210 to run at full (or near-full) power conditions in the active mode, to supply substantially all or all of a required power and/or speed demand of the common load 170. The second engine 104 may be controlled by the controller(s) 210 to operate at lower-power or no-output-power conditions to supply substantially none or none of a required power and/or speed demand of the common load 170. A clutch may be provided to declutch the low-power engine. Controller(s) 210 may control the engine's governing on power according to an appropriate schedule or control regime. The controller(s) 210 may comprise a first controller for controlling the first engine 102 and a second controller for controlling the second engine 104. The first controller and the second controller may be in communication with each other in order to implement the operations described herein. In some embodiments, a single controller 210 may be used for controlling the first engine 102 and the second engine 104.

In another example, an asymmetric operating regime of the engines may be achieved through the one or more controller's 210 differential control of fuel flow to the engines, as described in pending application Ser. No. 16/535,256, the entire contents of which are incorporated herein by reference. Low fuel flow may also include zero fuel flow in some examples.

Although various differential control between the engines of the multi-engine system 105 are possible, in one particular embodiment the controller(s) 210 may correspondingly control fuel flow rate to each engine 102, 104 accordingly.

In the case of the standby engine, a fuel flow (and/or a fuel flow rate) provided to the standby engine may be controlled to be between 70% and 99.5% less than the fuel flow (and/or the fuel flow rate) provided to the active engine. In the asymmetric operating regime, the standby engine may be maintained between 70% and 99.5% less than the fuel flow to the active engine. In some embodiments, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 210 may operate one engine (say 104) of the multi-engine system 105 in a standby mode at a power substantially lower than a rated cruise power level of the engine, and in some embodiments at substantially zero output power and in other embodiments less than 10% output power relative to a reference power (provided at a reference fuel flow). Alternately still, in some embodiments, the controller(s) 210 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the multi-engine system 105 of FIG. 1B may be operated in an asymmetric operating regime by control of the relative speed of the engines using controller(s) 210, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

Although the examples described herein illustrate two engines, the asymmetric operating regime is applicable to more than two engines, whereby at least one of the multiple engines is operated in a low-power standby mode while the remaining engines are operated in the active mode to supply all or substantially all of a required power and/or speed demand of a common load.

In use, the first engine (say 102) may operate in the active mode while the other engine (say 104) may operate in the standby mode, as described above. During the asymmetric operating regime, if the helicopter (H) needs a power increase (expected or otherwise), the second engine 104 may be required to provide more power relative to the low power conditions of the standby mode, and possibly return immediately to a high- or full-power condition. This may occur, for example, in an emergency condition of the multi-engine system 105 powering the helicopter, wherein the "active" engine loses power, and the power recovery from the lower power to the high power may take some time. Even absent an emergency, it will be desirable to repower the standby engine to exit the asymmetric operating regime.

In some embodiments, the standby engine may be declutched from the TCS 105 of the rotorcraft. As illustrated in FIG. 1B, first and second engines 102, 104 each having a respective transmission 152 are interconnected by a common output gearbox 150 to drive a common load 170. In one embodiment, the common load 170 may comprise a rotary wing of a rotary-wing aircraft. For example, the common load 170 may be a main rotor 108 of the aircraft 100. Depending on the type of the common load 170 and on the operating speed thereof, each of engines 102, 104 may be drivingly coupled to the common load 170 via the output gearbox 150, which may be of the speed-reduction type.

For example, the gearbox 150 may have a plurality of transmission shafts 156 to receive mechanical energy from respective output shafts 154 of respective engines 102, 104. The gearbox 150 may be configured to direct at least some of the combined mechanical energy from the plurality of gas turbine engines 102, 104 toward a common output shaft 158 for driving the common load 170 at a suitable operating (e.g., rotational) speed. It is understood that the transmission clutch system 105 may also be configured, for example, to drive accessories and/or other elements of an associated aircraft. The gearbox 150 may be configured to permit the common load 170 to be driven by either of the gas turbine engines 102, 104 or by a combination of both engines 102, 104 together.

Figure 2:
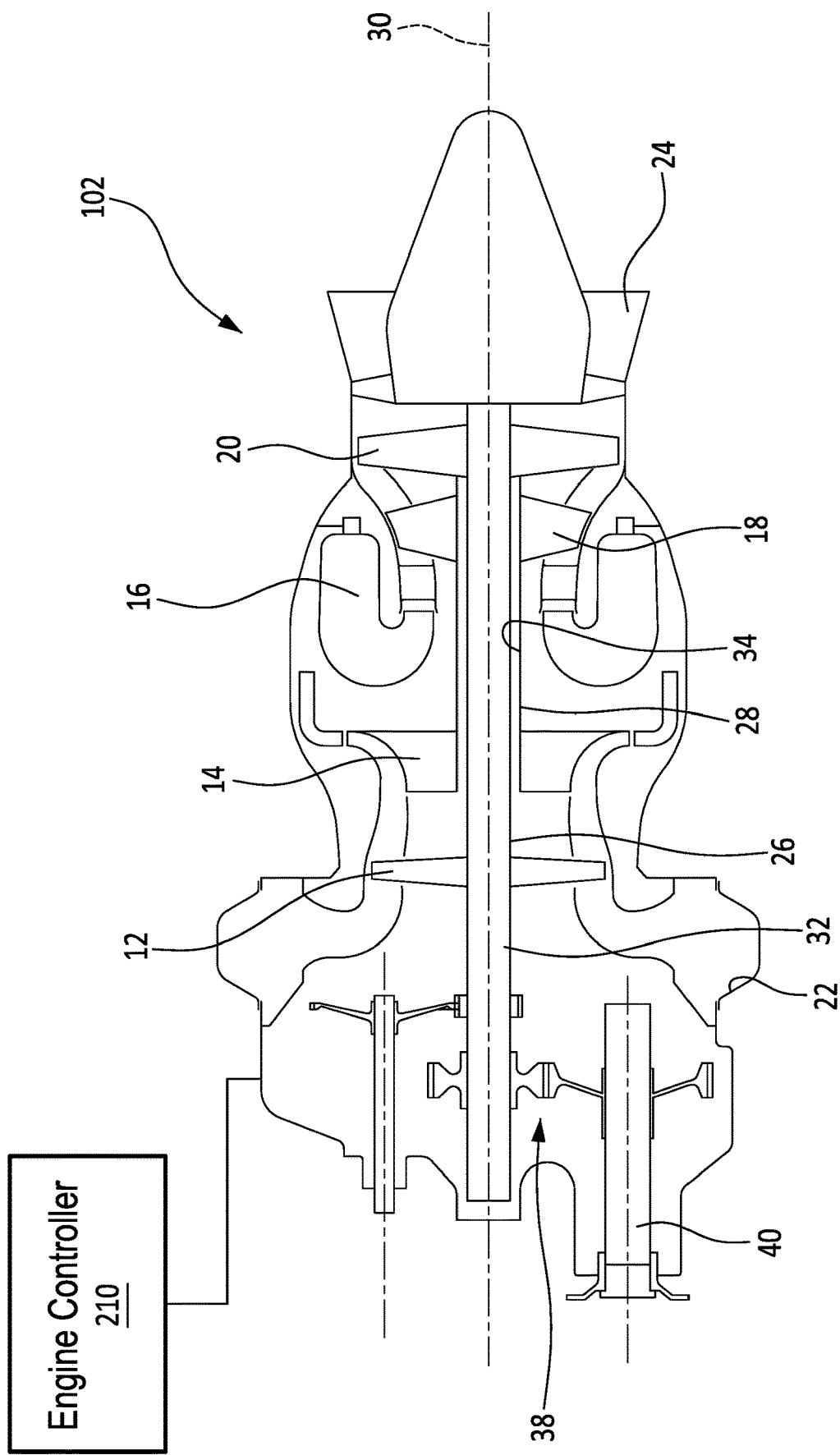
FIG. 2 is a cross-sectional view of an example turboshaft engine of the rotorcraft of FIG. 1A.

With reference to FIG. 2, the gas turbine engines 102, 104 can be embodied as turboshaft engines. Although the foregoing discussion relates to engine 102, it should be understood that engine 104 can be substantively similar to engine 102. In this example, the engine 102 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compressor stages. The low pressure compressor section 12 may include one or more variable guide vanes at its inlet or inter stage. The high pressure compressor section 14 may include one or more variable guide vanes at its inlet or inter stage. A compressor stage may include a compressor rotor, or a combination of the compressor rotor and a compressor stator assembly. In a multistage compressor configuration, the compressor stator assemblies may direct the air from one compressor rotor to the next.

The engine 102 has multiple, i.e. two or more, spools which may perform the compression to pressurize the air received through an air inlet 22, and which extract energy from the combustion gases before they exit via an exhaust outlet 24. In the illustrated embodiment, the engine 102 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 102 may include a transmission 38 driven by the low pressure shaft 32 and driving a rotatable output shaft 40. The transmission 38 may vary a ratio between rotational speeds of the low pressure shaft 32 and the output shaft 40.

The engine controller 210 can modulate a fuel flow rate provided to the engine 102, the position and/or orientation of variable geometry mechanisms within the engine 102, a bleed level of the engine 102, and the like. In some embodiments, the engine controller 210 is configured for controlling operation of multiple engines, for instance the engines 102 and 104.

Figure 3:
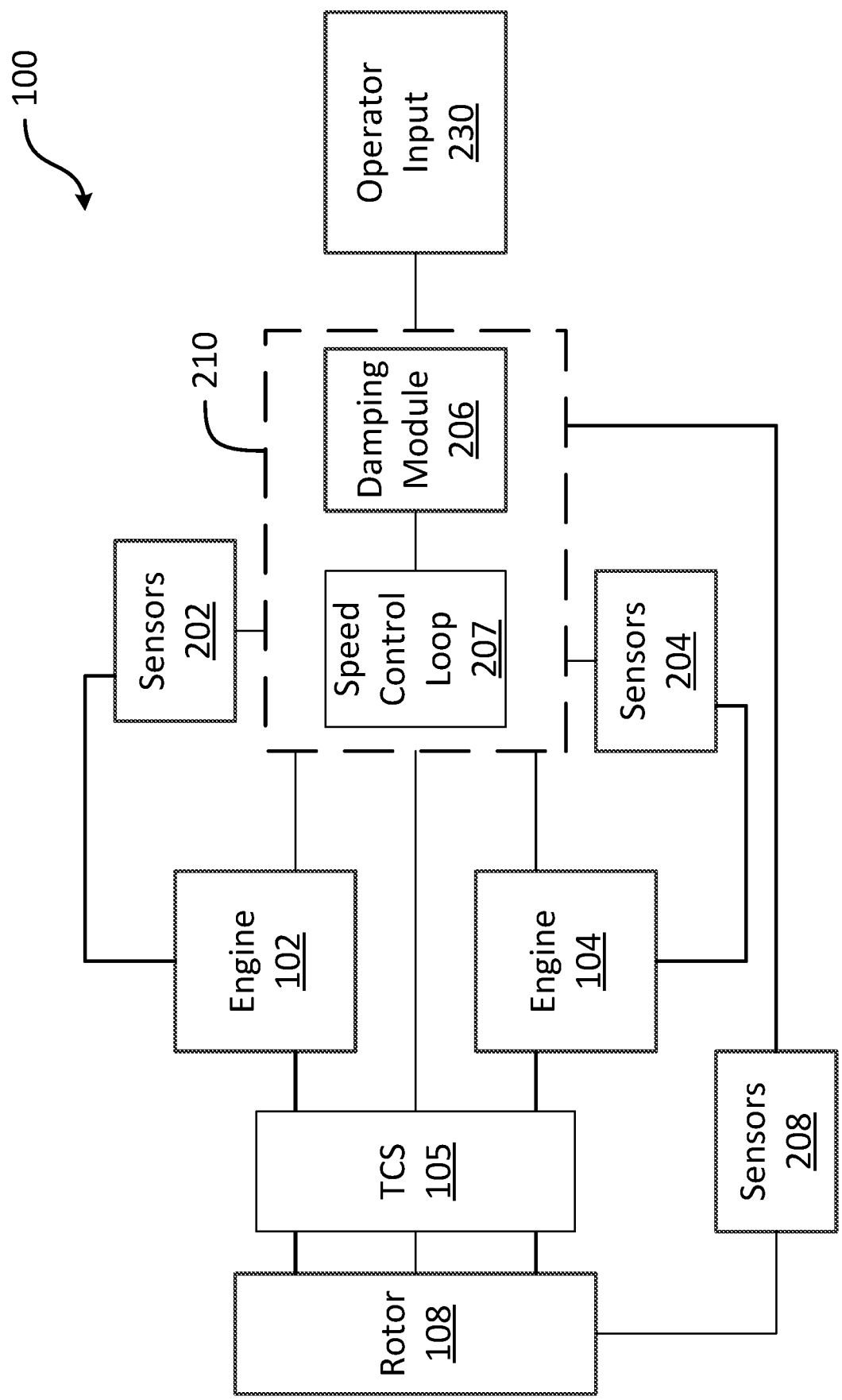
FIG. 3 is a block diagram of an example architecture for operating a rotorcraft.

With reference to FIG. 3, the rotorcraft 100, comprising the engines 102, 104 and the rotor 108, is illustrated using a block diagram. More than two engines 102, 104 may be present on a same rotorcraft 100. The engines 102, 104 are mechanically coupled to the main rotor 108 via the transmission clutch system (TCS) 105, for instance as illustrated in FIG. 1B, for causing the rotor 108 to rotate and produce thrust for the rotorcraft 100. Collectively, the engines 102, 104, and the rotor 108 form part of a multi-engine system which is controlled by the engine controller 210. The engine controller 210 is configured for receiving various instructions from an operator of the aircraft 100, for example via operator input 230, which can include one or more flight control inputs.

The engine controller 210 can be composed of various devices, including one or more FADECs, one or more rotor controllers, or any other suitable devices for controlling operation of the engines 102, 104, and/or the rotor 108. In some embodiments, the operation of the engines 102, 104, and of the rotor 108 is controlled by way of one or more actuators, mechanical linkages, hydraulic systems, and the like. The engine controller 210 can be coupled to the actuators, mechanical linkages, hydraulic systems, and the like, in any suitable fashion for effecting control of the engines 102, 104 and/or of the rotor 108. For example, if a change in the operating conditions of the rotorcraft 100 is detected without any corresponding change in inputs from an operator of the rotorcraft 100, the engine controller 210 can adjust the inputs to compensate for the uncommanded change.

One or more sensors 202, 204 are coupled to the engines 102, 104, for acquiring data about the operating parameters of the engines 102, 104. Additionally, sensors 208 are coupled to the rotor 108 for acquiring data about the operating parameters of the rotor 108. The sensors 202, 204, 208 may be any suitable type of sensor used to measure operating parameters including, but not limited to, speed sensors, acceleration sensors, pressure sensors, temperature sensors, altitude sensors, and the like. The sensors 202, 204, 208, can be coupled to the engine controller 210 in any suitable fashion, including any suitable wired and/or wireless coupling techniques.

In certain conditions, the rotor 108 of the rotorcraft 100 is driven with a first engine, for example engine 102, while a second engine, for example engine 104, is unclutched from the transmission clutch system 105. The engine controller 210 can be configured to control a speed of the output shaft 154 of the second engine 104 during a re-clutching procedure of the second engine 104. In some embodiments, while the second engine 104 is accelerating to reach a re-clutching speed, i.e. a speed at which the output shaft 154 can engage with a clutch in the gearbox 150, a damping module 206 applies a damping function to a speed control loop 207 of the second engine 104. This will be referred to as "dampened re-clutching" herein.

The damping function applied by the damping module 206 to the speed control loop 207 may vary according to various implementations. The damping function has the effect of slowing down the rotational speed of the output shaft of the re-clutching engine prior to the re-clutching engine reaching a re-clutching speed. Controlling the rotational speed of the output shaft in the manner described herein limits the torque/power at the moment of re-clutching. During the un-clutched engine's run-up to the moment before re-clutching, torque cannot be measured as there is no opposing load on the output shaft to create a twist. If the engine output shaft is still accelerating at the moment of re-clutching, i.e. the moment torque starts to be measured, the torque may already be too high and thus damage the clutch. Therefore, the rotational speed of the output shaft is controlled to limit torque/power. The engine may be accelerated before re-clutching and then acceleration is limited at the moment of re-clutching using the damping function.

Figure 4A:
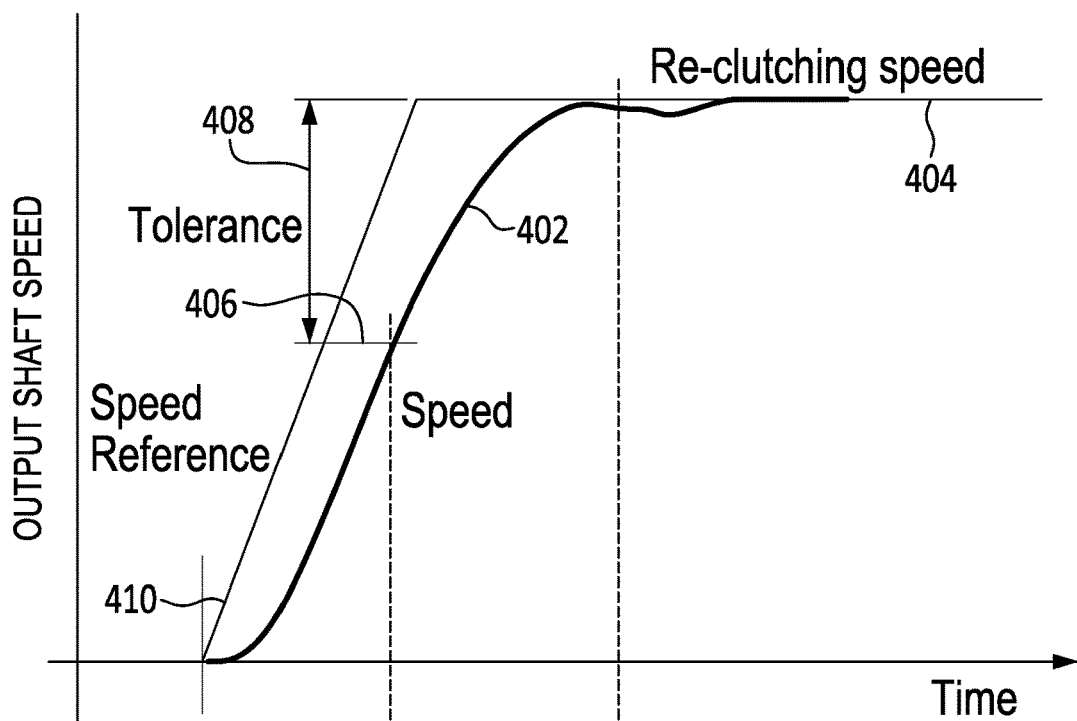
FIGS. 4A-4B are graphical illustrations of example approaches for applying a damping function to a torque request.
Figure 4B:
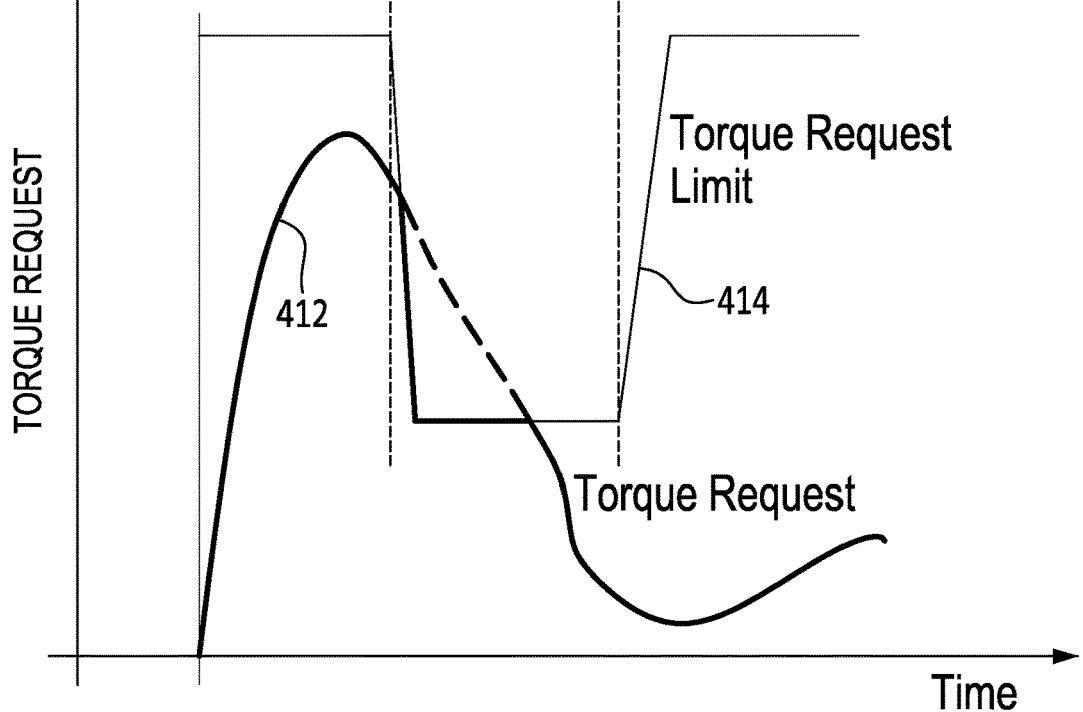

In some embodiments, the damping function corresponds to a limit on a torque request for the re-clutching engine. An example is illustrated in FIGS. 4A-4B. FIG. 4A illustrates an example of a rotational speed 402 of the output shaft of the re-clutching engine, when the engine has been instructed to accelerate to a re-clutching speed 404. FIG. 4B illustrates an example of a torque request 412 for the re-clutching engine. The torque request 412 is used by the speed control loop 207 to determine a fuel flow needed to obtain a desired power turbine speed. When the rotational speed 402 reaches a target speed 406 that is within a tolerance 408 of the re-clutching speed 404, a limit 414 is applied to the torque request 412.

The torque request limit 414 is momentarily applied to the torque request 412, to prevent over-torque during re-clutching. The torque request limit 414 dampens the acceleration of the re-clutching engine, thereby slowing down the output shaft speed 402 in its final approach to the re-clutching speed 404 and reducing a re-clutching torque.

The value (or schedule) of the torque request limit 414 may be found through testing and/or simulations, to determine an optimal value. In some embodiments, a plurality of torque request limits 414 are available and a given torque request limit is selected as a function of one or more parameters, such as acceleration, or directly per mechanical design limit of the clutch. The selection may be made by the engine controller 210, such as by the damping module 206.

The torque request limit 414 may be removed from the torque request 412 once the re-clutching speed 404 has been reached by the output shaft of the re-clutching engine. Removal may be determined as a function of a speed error (i.e. a difference between the output shaft speed 402 and a speed reference 410), a sensed torque, a collective lever pitch (CLP), time, or any other suitable parameter.

The tolerance 408 used to trigger the application of the torque request limit 414 may be predetermined or may be determined dynamically, for example as a function of acceleration where tolerance 408 is proportional to acceleration. In other words, the higher the acceleration, the sooner the speed needs to be slowed down. Other embodiments are also considered.

Figure 5A:
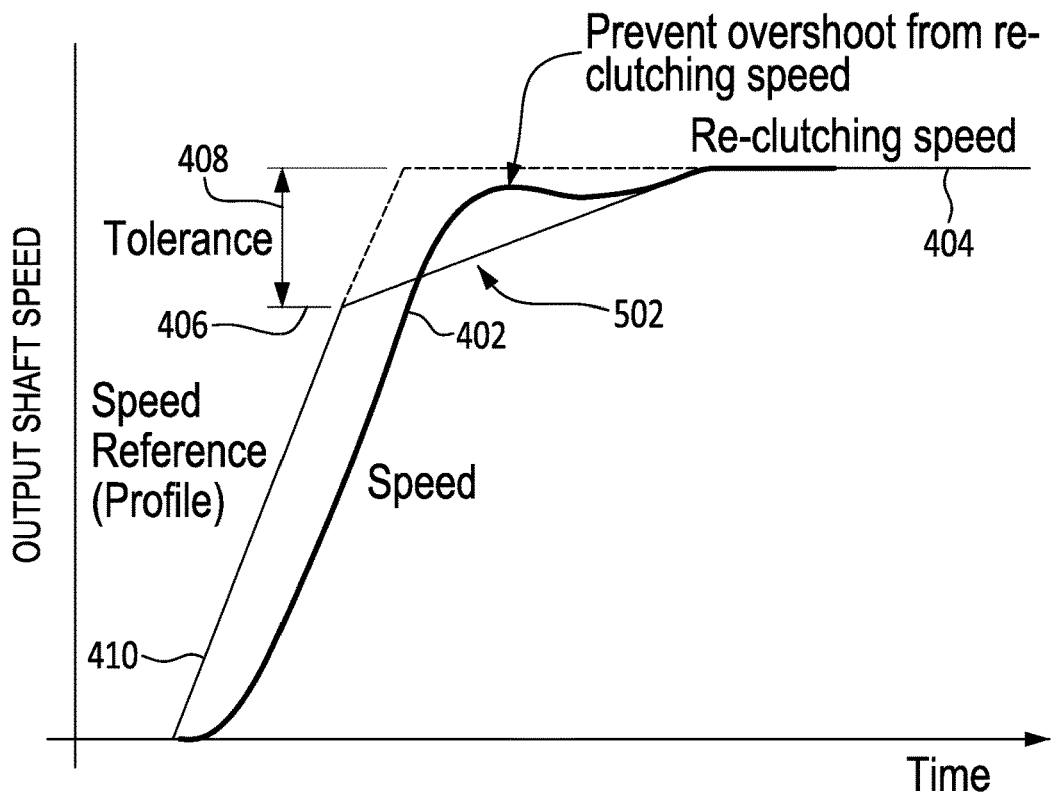
FIGS. 5A-5D are graphical illustrations of example approaches for applying a damping function a speed reference.

In some embodiments, the damping function is applied to a speed reference to which the output shaft speed tracks. A portion of the speed reference is shaped in accordance with a profile that will cause the rotational speed of the output shaft of the re-clutching engine to slow down upon its final approach to the re-clutching speed. Examples are illustrated in FIGS. 5A-5D. FIG. 5A illustrates a first example, whereby a portion of a speed reference 410 is shaped according to a ramp profile 502. The ramp profile 502 acts as a tapering off of the speed reference 410 starting from the target speed 406.

Figure 5B:
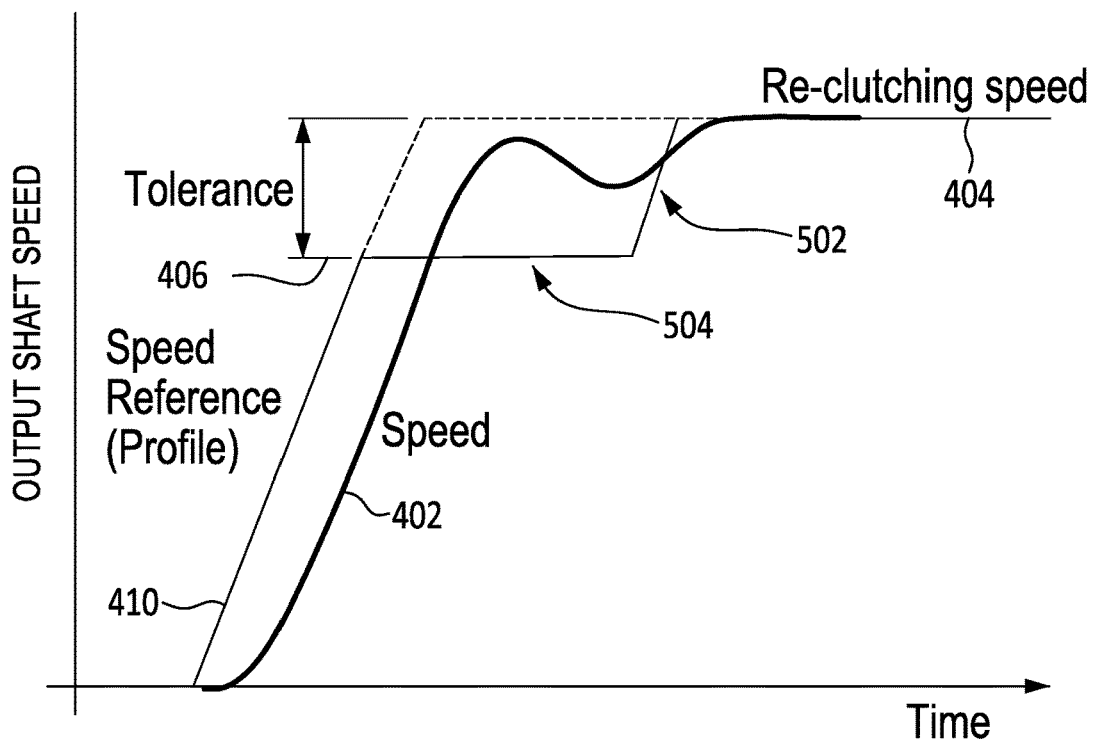

FIG. 5B illustrates another example, whereby the speed reference 410 is tapered off in a hold profile 504 followed by a ramp profile 502 to the re-clutching speed. In other words, when the rotational speed 402 of the output shaft reaches the target speed 406, the speed reference 410 is held to the target speed 406 for a given time period (the hold profile 504) and then ramped up to the re-clutching speed (the ramp profile 502). The duration of the hold profile 504 may be predetermined or set dynamically. For example, the duration of the hold profile 504 may be based on acceleration. Other embodiments are also considered.

A slope of the ramp profile may be predetermined or set dynamically. For example, the slope of the ramp profile 502 may be proportional to a difference between the re-clutching speed 404 and the rotational speed 402 (i.e. a speed error) when the speed 402 is above the hold profile 504 and acceleration is below a threshold. If the speed error is small, the ramp profile 502 can be steeper as the re-clutching torque will be minor. If the speed error is large, the ramp profile 502 will need to be more gradual. Other embodiments are also considered. In some embodiments, the ramp profile 502 has an infinite slope and the hold profile 504 and ramp profile 502 together form a step profile.

Figure 5C:
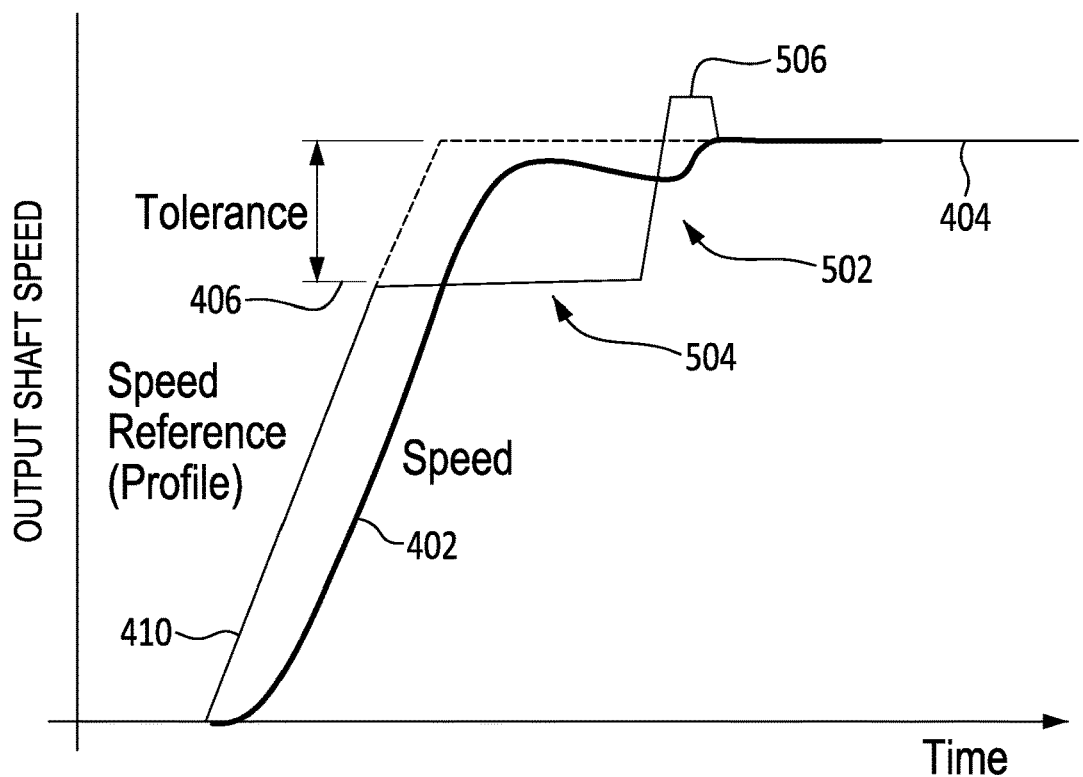

In some embodiments, the ramp profile 502 begins at the target speed 406 (following a hold profile 504 or not) and continues to a reference speed that is greater than the re-clutching speed 404, before decreasing to the re-clutching speed 404. An example is shown in FIG. 5C. When a reference speed 506 is reached, the speed reference 410 may be shaped in various manners to return to the re-clutching speed 404, such as but not limited to a step, a decreasing ramp, a combination of a hold and a ramp, and the like. The reference speed 506 may be predetermined or set dynamically. For example, when the hold profile 504 transitions to the reference speed 506 through the ramp profile 502, the reference speed 506 is set such that the difference between the reference speed 506 and the re-clutching speed 404 is proportional to the difference between the re-clutching speed 404 and the ramp profile 502. Other embodiments are also considered.

Figure 5D:
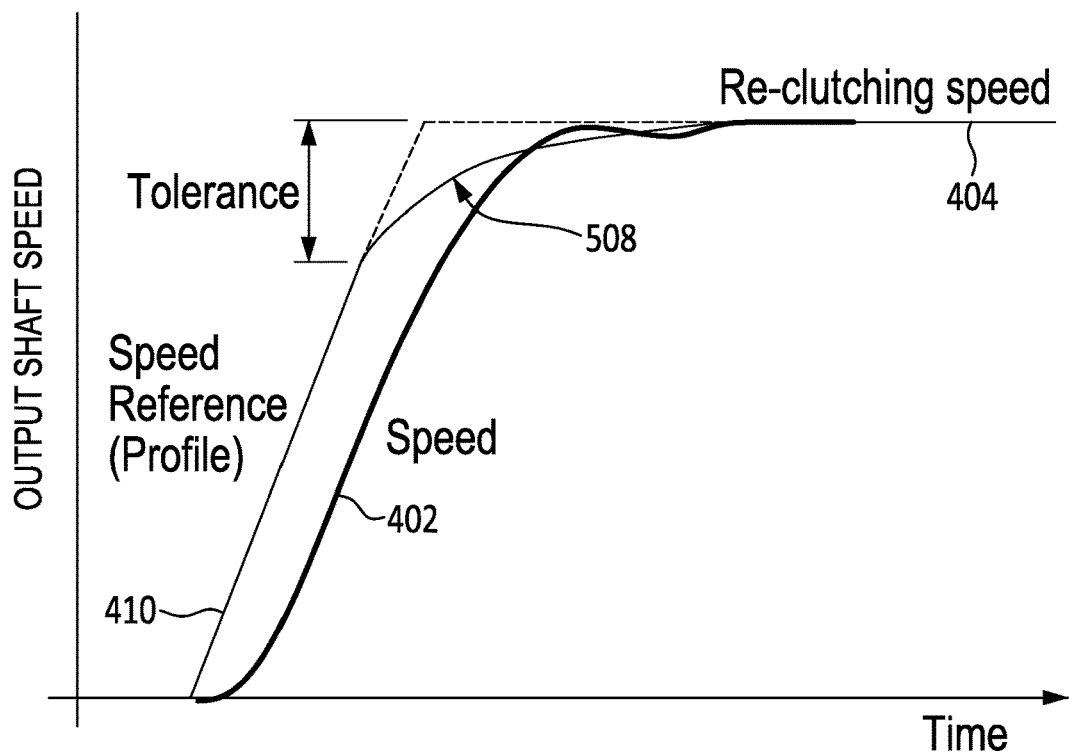

FIG. 5D illustrates yet another example of applying the damping function to the speed reference 410. In this example, the speed reference 410 is tapered off using a reference model 508, for example, exhibiting a first-order transfer function response in the final approach to the re-clutching speed 404. Other reference models may also be used, such as but not limited to first order or second-order transfer functions.

When applied to the speed reference 410, the damping function may correspond to any profile that causes the output shaft speed 402 to slowdown in its final approach to the re-clutching speed 404. The rate of change of the profile, the duration of the profile, and the level of the profile can be dependent on any one or more of time, CLP, sensed speed, and acceleration.

Figure 6A:
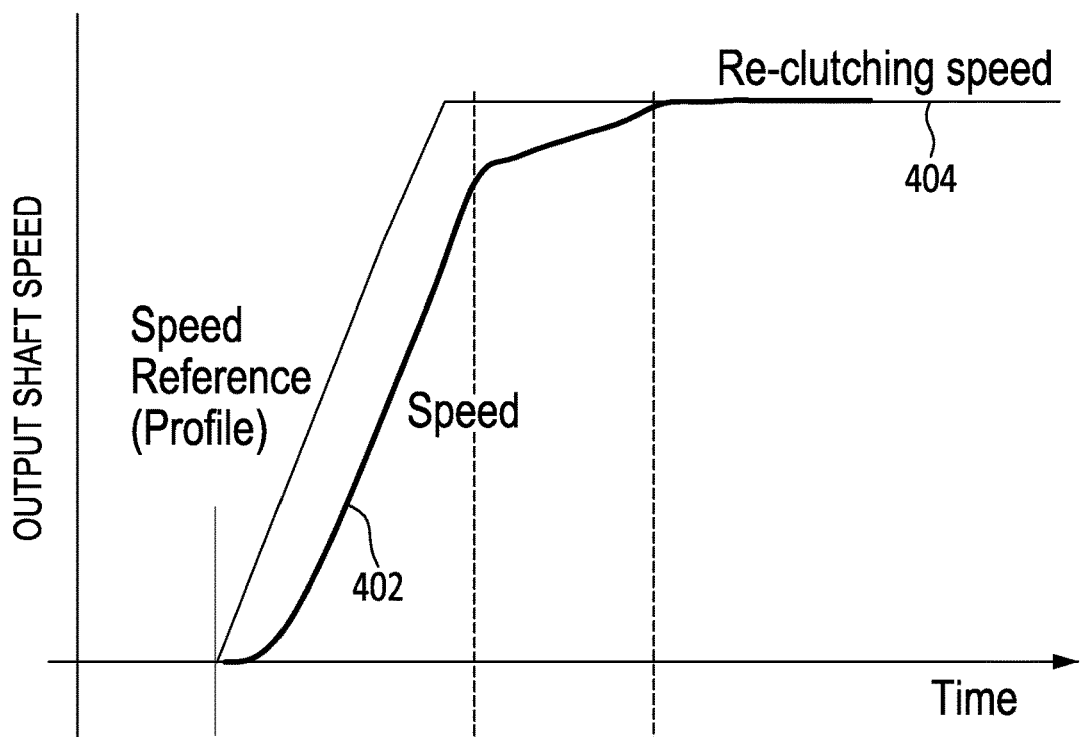
FIGS. 6A-6B are graphical illustrations of example approaches for applying a damping function to an acceleration.
Figure 6B:
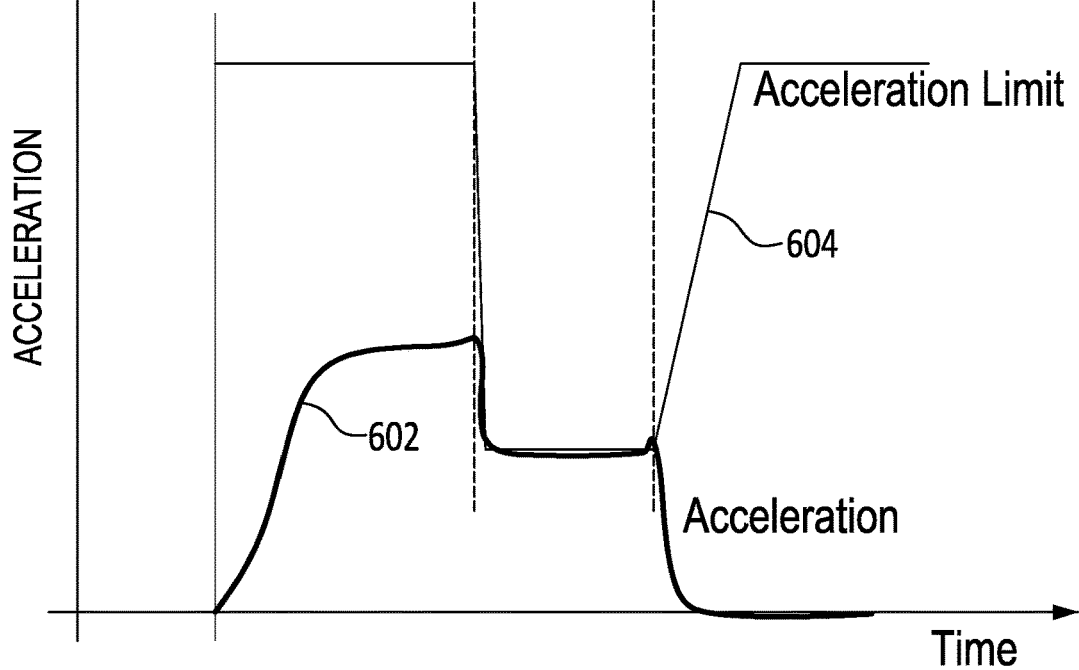

In some embodiments, the damping function is applied to an acceleration of the re-clutching engine. An example is shown in FIGS. 6A-6B. FIG. 6A illustrates the output shaft speed 402 of the re-clutching engine. FIG. 6B illustrates the acceleration 602 of the power turbine (NPdot). An acceleration limit 604 is applied to the acceleration 602 in order to slowdown the output shaft speed 402 in its final approach to the re-clutching speed 404. The acceleration limit 604 is scheduled as a function of the output shaft speed 402, and can remain active, be modified, or phased out after the output shaft speed 402 has reached the re-clutching speed 404.

Figure 7A:
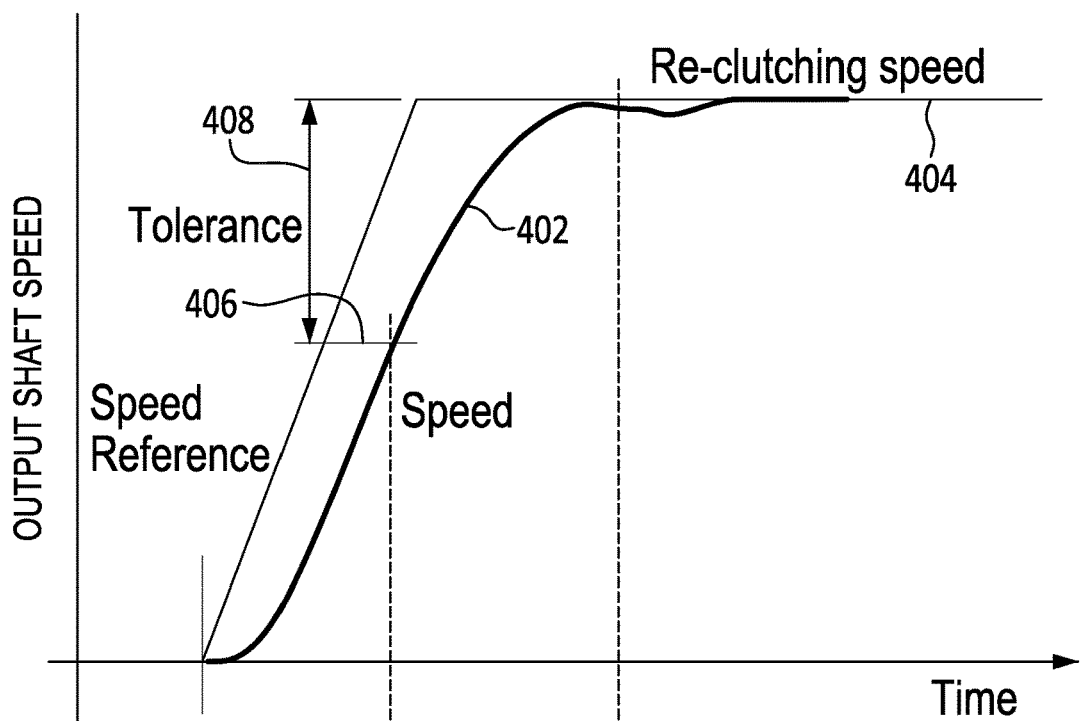
FIGS. 7A-7B are graphical illustrations of example approaches for applying a damping function to a fuel flow.
Figure 7B:
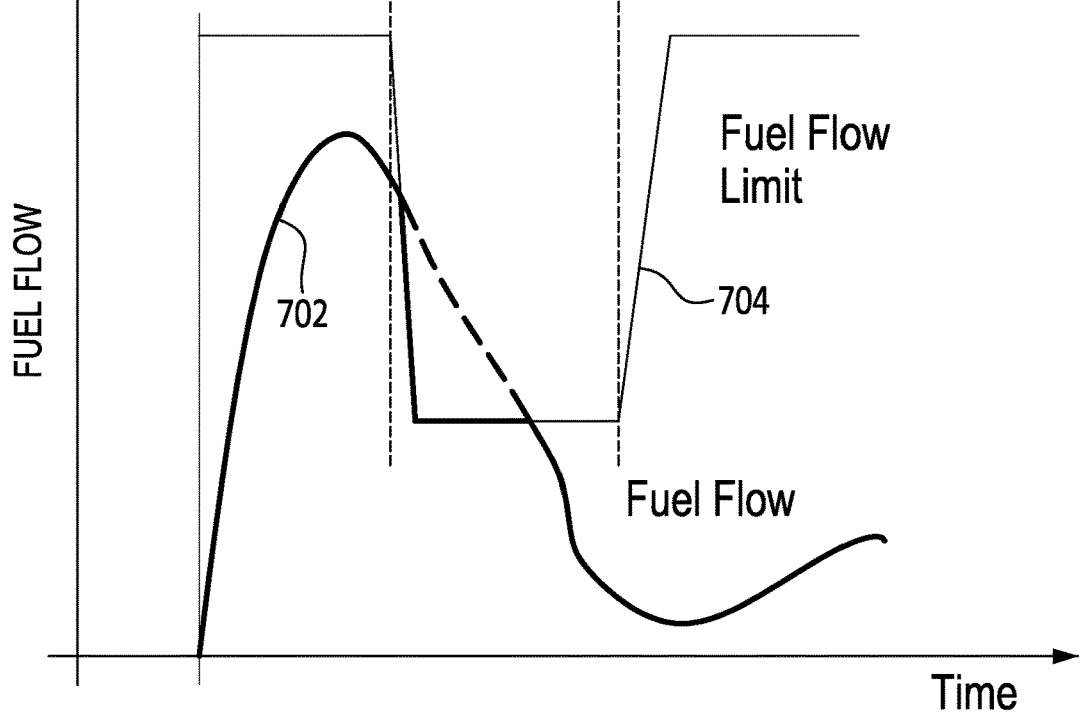

In some embodiments, the damping function is applied to a fuel flow for the re-clutching engine. An example is shown in FIGS. 7A-7B. FIG. 7A illustrates the output shaft speed 402 of the re-clutching engine. FIG. 7B illustrates the fuel flow 702 for the re-clutching engine. A fuel flow limit 704, or maximum fuel flow command, is momentarily lowered as the output shaft speed 402 approaches the re-clutching speed 404. A sensed speed of the output shaft may trigger the lowering of the fuel flow limit 704, for example when the output shaft speed 402 reaches the target speed 406. The tolerance 408 may be predetermined or dynamically selected. For example, the tolerance 408 may be proportional to acceleration, where the higher the acceleration, the sooner the rotational speed 402 is slowed down. This suppression in fuel flow reduces the engine output torque at the moment of re-clutching. The level to which the fuel flow limit 704 is lowered may be dependent on the speed error and/or a rate of change of the rotational speed 402 (i.e. acceleration). The fuel flow limit 704 may be raised back to its original value, either gradually or in a step profile, after the output shaft speed 402 has reached the re-clutching speed 404, as a function of one or more of time, sensed speed error, acceleration, sensed torque, and CLP.

Figure 8A:
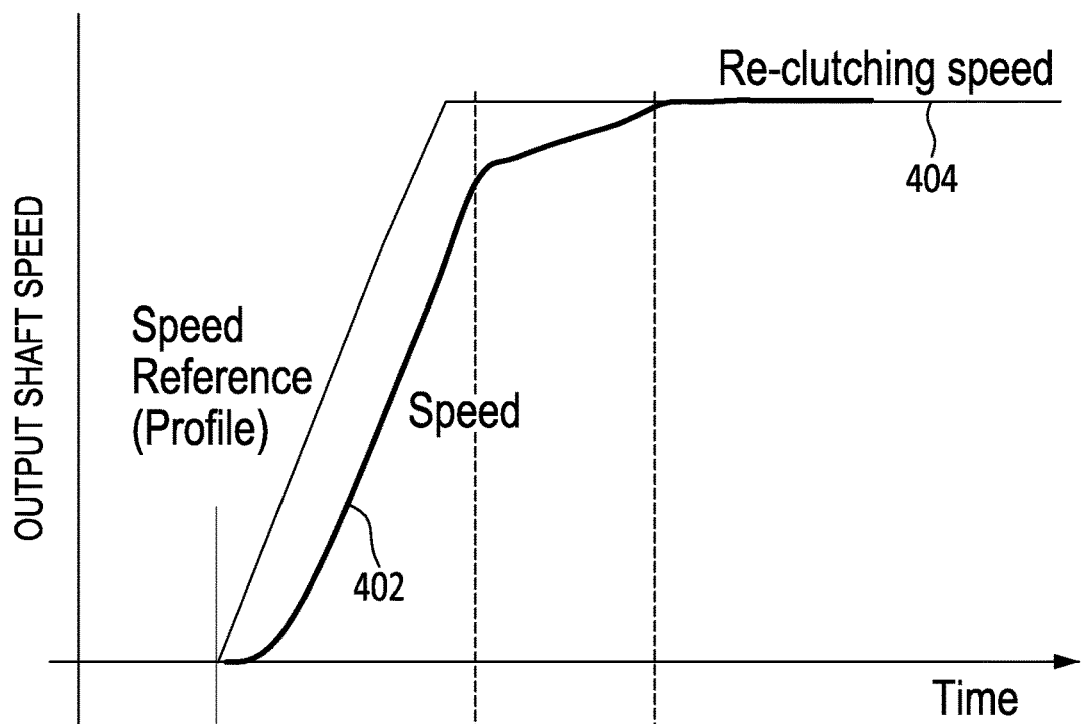
FIGS. 8A-8B are graphical illustrations of example approaches for applying a damping function to a rate of change of a fuel flow.
Figure 8B:
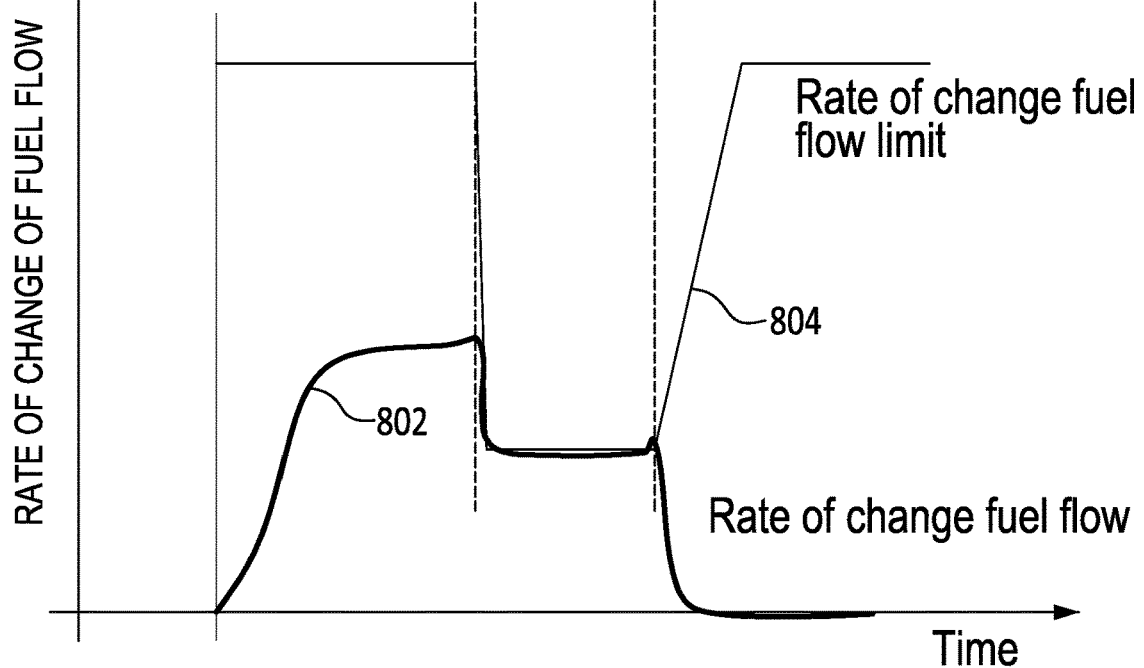

In some embodiments, the damping function is applied to a rate of change of the fuel flow to the re-clutching engine. An example is shown in FIGS. 8A-8B. FIG. 8A illustrates the output shaft speed 402 of the re-clutching engine. FIG. 8B illustrates the rate of change of the fuel flow 802 for the re-clutching engine. A rate of change of fuel flow limit 804 is used to vary the increasing and decreasing rate of change of fuel flow command. For example, an increasing rate of change of the fuel flow is boosted to control engine rapid acceleration and then a decreasing rate of change of fuel flow is boosted to lower the output torque of the re-clutching engine upon re-clutching. The conditions and moments to boost the rate of change of fuel flow may be a function of one or more of time, sensed speed error, acceleration, sensed torque, and CLP. The engine is accelerated by increasing fuel flow but limited by a maximum rate of change of the fuel flow. Boosting an increasing rate of change refers to increasing the allowable maximum rate of change of fuel flow (e.g. from 1000 pph/s to 1500 pph/s), hence allowing fuel flow to increase more rapidly which in turn increases the acceleration of the engine. Similarly for decelerating the engine or slowing the acceleration of the engine, boosting a decreasing rate of change of fuel flow refers to decreasing the allowable minimum rate of change of fuel flow (e.g. from −1000 pph/s to −1500 pph/s), hence allowing fuel flow to decrease more rapidly which in turn increases the deceleration of the engine.

Figure 9:
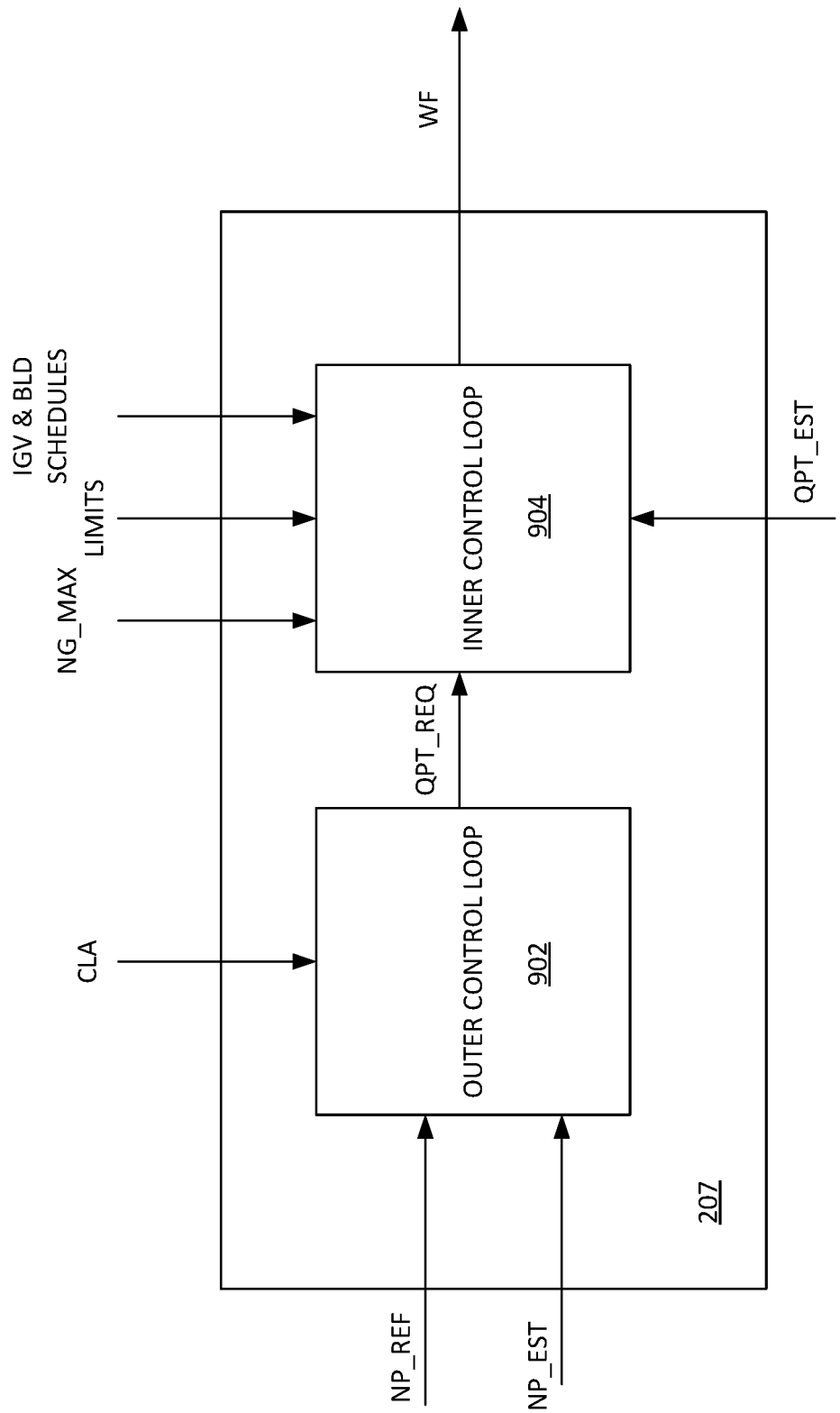
FIG. 9 is a block diagram of an example embodiment for a speed control loop.

An example embodiment of the speed control loop 207 is illustrated in FIG. 9. In this example, the engine speed is governed by an outer control loop 902 that receives a desired power turbine speed signal (NP_REF) and an estimated power turbine speed signal (NP_EST). The outer control loop 902 may also receive a signal indicative of a collective lever angle command (CLA). Based at least in part on the received signals, the outer control loop determines a torque request of the power turbine (QPT_REQ) that will bring NP_EST in line with NP_REF. A signal indicative of QPT_REQ is sent from the outer control loop 902 to an inner control loop 904. The inner control loop 904 may also receive a signal indicative of an estimated power turbine torque (QPT_EST) as well as other inputs, such as signals indicative of a gas generator speed maximum limit (NG_MAX), inlet guide vane and stability bleed schedules (IGV & BLD schedules), and other limits. The inner control loop 904 determines a fuel flow (WF) that will deliver the power turbine torque request as determined by the outer control loop 902.

When using the embodiment of FIG. 9 for the speed control loop 207, the damping module 206 may be configured to apply a torque request limit to the outer control loop 902 or the inner control loop 904, as the torque request is determined in the outer control loop 902 and provided to the inner control loop 904. The damping module 206 may be configured to shape the speed reference prior to having it received at the outer control loop 902, or to instruct the outer control loop 902 to shape the speed reference accordingly. The damping module 206 may be configured to apply the acceleration limit to the inner control loop 904 as one of the limits input thereto. The damping module 206 may be configured to apply the fuel flow limit and/or the rate of change of fuel flow limit to the inner control loop 904 as one of the limits input thereto. Other implementations are also considered.

Figure 10:
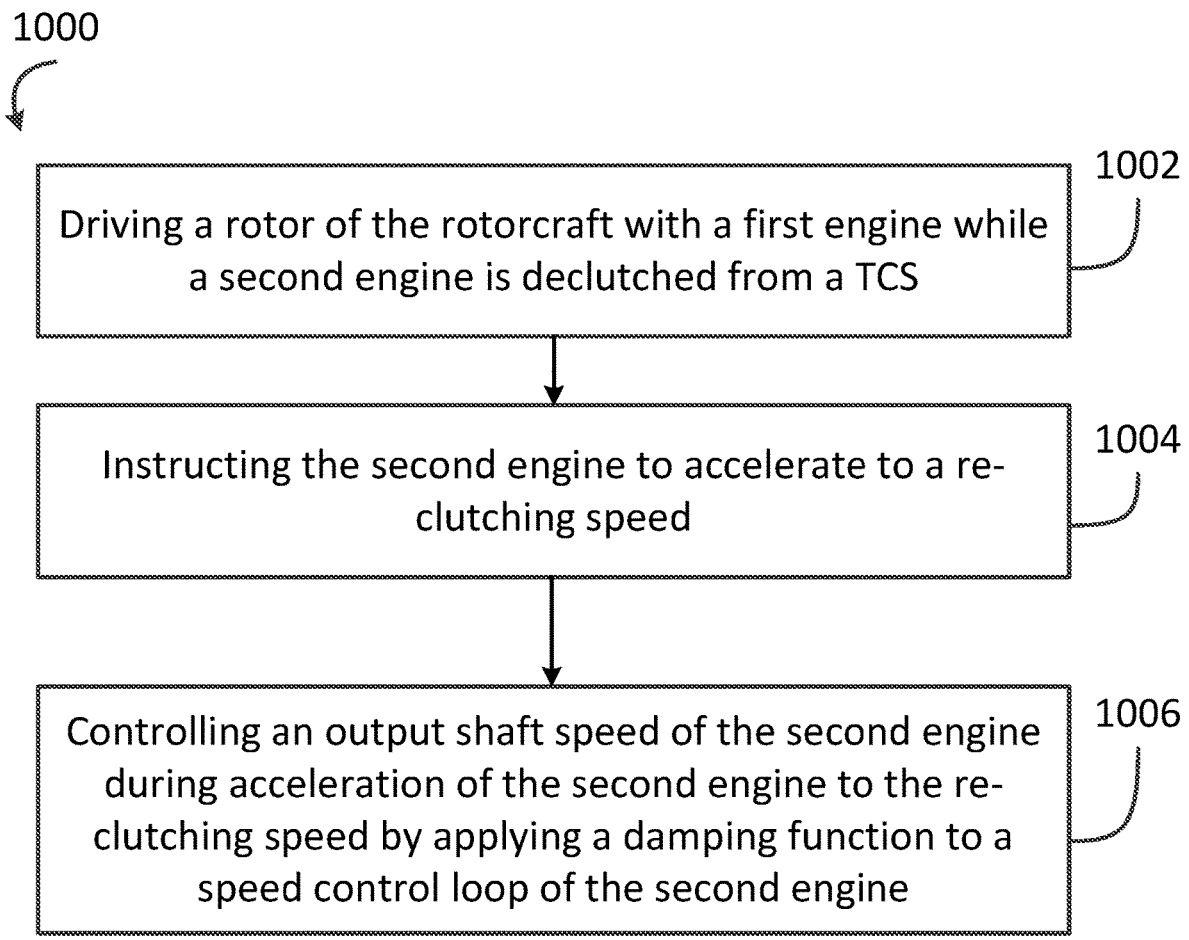
FIG. 10 is a flowchart of an example method for operating a dual-engine rotorcraft.

With reference to FIG. 10, there is shown a flowchart illustrating a method 1000 for operating a multi-engine aircraft, for instance the rotorcraft 100. In some embodiments, the rotorcraft 100 is a helicopter, which can comprise a plurality of engines which are configured to provide motive power to the rotorcraft, and at least one rotor coupled to the plurality of engines, for example the rotor 108.

At step 1002, the rotor 108 of the rotorcraft 100 is driven with at least a first engine, such as engine 102, while at least a second engine, such as engine 104, is de-clutched from a transmission clutch system that couples the rotor 108 and the second engine 104. This may happen while the rotorcraft is inflight or when the rotorcraft is on the ground, for example during engine run-ups. Additional engines may also be driving the rotor 108 in addition to the first engine 102.

At step 1004, the second engine is instructed to accelerate to a re-clutching speed. This instruction may come, for example, from the engine controller 210, in response to a change in engine and/or aircraft parameters, such as a failure to the first engine 102 or to any other engine driving the rotor 108. The instruction may also be triggered in response to a pilot input for increased power, for example via an increase to a power lever angle (PLA) in a cockpit of the rotorcraft. Other circumstances may also trigger the instructions to accelerate to the re-clutching speed.

At step 1006, the output shaft speed of the second engine is controlled during its acceleration to the re-clutching speed by applying a damping function to a speed control loop of the second engine. As indicated above, the damping function may take various forms, such as a limit applied to an operating parameter of the re-clutching engine that causes the output shaft speed to slowdown on its approach to the re-clutching speed. The slowdown prevents a speed overshoot upon re-clutching, thus minimizing the torque applied to the transmission clutch system as the re-clutching engine engages the gearbox. The rapid engine run-up followed by dampened re-clutching can be achieved by the engine controller 210 using one or a combination of the different embodiments described herein. While the re-clutching engine is decoupled from the transmission clutch system, the rotor operating speed is maintained by one or more other engines, by the pilot manipulating the CLP, or via automatic control of the CLP through a flight control system.

In some embodiments, the method 1000 is performed by the FADEC of the rotorcraft 100, or any other suitable engine electronic controller, which can implement part or all of the engine controller 210. In some embodiments, a portion of the method 1000 is performed by the FADEC or other suitable engine electronic controller.

Figure 11:
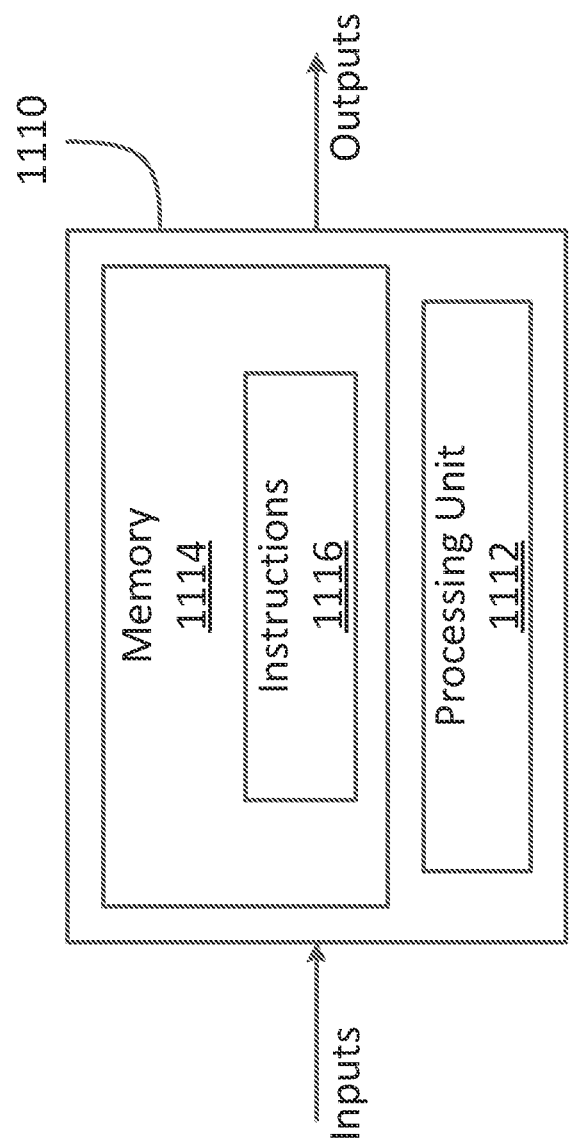
FIG. 11 is a block diagram of an example computing device for implementing the method of FIG. 10.

With reference to FIG. 11, the method 1000 may be implemented by a computing device 1110, which can embody part or all of the engine controller 210, the speed control loop 207, and/or the damping module 206. The computing device 1110 comprises a processing unit 1112 and a memory 1114 which has stored therein computer-executable instructions 1116. The processing unit 1112 may comprise any suitable devices configured to implement the functionality of the engine controller 210 and/or the functionality described in the method 1000, such that instructions 1116, when executed by the computing device 1110 or other programmable apparatus, may cause the functions/acts/steps performed by the engine controller 210 and/or described in the method 1000 as provided herein to be executed. The processing unit 1112 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 1114 may comprise any suitable known or other machine-readable storage medium. The memory 1114 may comprise non-transitory computer readable storage medium, for example, but not limited to, an electronic, magnetic, optical, electromagnetic, infrared, or semiconductor system, apparatus, or device, or any suitable combination of the foregoing. The memory 1114 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 1112.

The methods and systems for operating a rotorcraft as described herein may be implemented in a high level procedural or object oriented programming or scripting language, or a combination thereof, to communicate with or assist in the operation of a computer system, for example the computing device 1110. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 1112 of the computing device 1110, to operate in a specific and predefined manner to perform the functions described herein, for example those described in the method 1000.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a multi-engine rotorcraft, the method comprising:
   driving a rotor of the multi-engine rotorcraft with a first engine while a second engine is de-clutched from a transmission clutch system that couples the rotor and the second engine;
   instructing the second engine to accelerate to a re-clutching speed; and
   controlling an output shaft speed of the second engine during acceleration of the second engine to the re-clutching speed for limiting at least one of power or torque of the second engine for re-clutching the second engine to the transmission clutch system, the controlling comprising:
      applying a limit to a torque request for the second engine, the applying the limit to the torque request comprising selecting a value of the torque request limit from a plurality of torque request limits based on the acceleration of the second engine; and shaping a speed reference to which the output shaft speed tracks, the shaping the speed reference based on at least one of the acceleration of second engine and on a difference between the re-clutching speed and the output shaft speed of the second engine.

2. The method of claim 1, wherein applying the limit to the torque request for the second engine comprises determining a fuel flow needed to obtain the re-clutching speed.

3. The method of claim 1, wherein shaping the speed reference comprises slowing down the acceleration of the second engine before reaching the re-clutching speed.

4. The method of claim 1, wherein shaping the speed reference comprises tapering off the speed reference in a ramp profile to the re-clutching speed.

5. The method of claim 1, wherein shaping the speed reference comprises tapering off the speed reference in a hold profile followed by a ramp profile to the re-clutching speed.

6. The method of claim 1, wherein shaping the speed reference comprises tapering off the speed reference in a hold profile followed by a ramp profile to a target speed greater than the re-clutching speed before decreasing the speed reference to the re-clutching speed.

7. The method of claim 1, further comprising applying a limit to the acceleration rate of the second engine based on the output shaft speed of the second engine, the applying the limit to the acceleration rate comprising slowing down the acceleration rate of the second engine before reaching the re-clutching speed.

8. The method of claim 1, further comprising applying a limit to a fuel flow for the second engine based on the output shaft speed of the second engine, the applying the limit to the fuel flow comprising lowering a maximum fuel flow command to the second engine before reaching the re-clutching speed.

9. The method of claim 1, further comprising applying a limit to a rate of change of a fuel flow of the second engine based on one or more of time, sensed speed error, the acceleration of the second engine, sensed torque and collective lever pitch, the applying the limit to the rate of change of the Fuel flow of the second engine comprising decreasing the rate of change of the fuel flow upon re-clutching the second engine to the transmission clutch system.

10. A system for operating a multi-engine rotorcraft, the system comprising:
a processing unit; and
a non-transitory computer-readable medium having stored thereon program instruction executable by the processing unit for:
driving a rotor of the multi-engine rotorcraft with a first engine while a second engine is de-clutched from a transmission clutch system that couples the rotor and the second engine;
instructing the second engine to accelerate to a re-clutching speed; and
controlling an output shaft speed of the second engine during acceleration of the second engine to the re-clutching speed for limiting at least one of power or torque of the second engine for re-clutching the second engine to the transmission clutch system, the controlling comprising:
applying a limit to a torque request for the second engine, the applying the limit to the torque request comprising selecting a value of the torque request limit from a plurality of torque request limits based on the acceleration of the second engine; and
shaping a speed reference to which the output shaft speed tracks, the shaping the speed reference based on at least one of the acceleration of the second engine and on a difference between the re-clutching speed and the output shaft speed of the second engine.

11. The system of claim 10, wherein applying the limit to the torque request for the second engine comprises determining a fuel flow needed to obtain the re-clutching speed.

12. The system of claim 10, wherein shaping the speed reference comprises slowing down the acceleration of the second engine before reaching the re-clutching speed.

13. The system of claim 10, wherein shaping the speed reference comprises tapering off the speed reference in a ramp profile to the re-clutching speed.

14. The system of claim 10, wherein shaping the speed reference comprises tapering off the speed reference in a hold profile followed by a ramp profile to the re-clutching speed.

15. The system of claim 10, wherein shaping the speed reference comprises tapering off the speed reference in a hold profile followed by a ramp profile to a target speed greater than the re-clutching speed before decreasing the speed reference to the re-clutching speed.

16. The system of claim 10, further comprising applying a limit to the acceleration rate of the second engine based on the output shaft speed of the second engine, the applying the limit to the acceleration rate comprising slowing down the acceleration rate of the second engine before reaching the re-clutching speed.

17. The system of claim 10, further comprising applying a limit to a fuel flow for the second engine based on the output shaft speed of the second engine, the applying the limit to the fuel flow comprising lowering a maximum fuel flow command to the second engine before reaching the re-clutching speed.

18. The system of claim 10, further comprising applying a limit to a rate of change of a fuel flow of the second engine based on one or more of time, sensed speed error, the acceleration of the second engine, sensed torque and collective lever pitch, the applying the limit to the rate of change of the fuel flow of the second engine comprising decreasing the rate of change of the fuel flow upon re-clutching the second engine to the transmission clutch system.

* * * * *